United States Patent
Poole et al.

(10) Patent No.: US 11,367,073 B2
(45) Date of Patent: Jun. 21, 2022

(54) SYSTEM AND METHOD FOR FRAUD CONTROL

(71) Applicant: Capital One Financial Corporation, McLean, VA (US)

(72) Inventors: Thomas S. Poole, Chantilly, VA (US); Lawrence Douglas, McLean, VA (US); Matthew R. Brolund, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 401 days.

(21) Appl. No.: 14/322,954

(22) Filed: Jul. 3, 2014

(65) Prior Publication Data

US 2015/0012436 A1 Jan. 8, 2015

Related U.S. Application Data

(60) Provisional application No. 61/842,463, filed on Jul. 3, 2013.

(51) Int. Cl.
*G06Q 20/10* (2012.01)
*G06Q 20/40* (2012.01)
(Continued)

(52) U.S. Cl.
CPC ....... *G06Q 20/4016* (2013.01); *G06Q 20/204* (2013.01); *G06Q 20/3224* (2013.01); *G06Q 20/3278* (2013.01); *G06Q 20/34* (2013.01)

(58) Field of Classification Search
CPC .................................................. G06Q 20/204
(Continued)

(56) References Cited

U.S. PATENT DOCUMENTS

2008/0217399 A1* 9/2008 Leblanc ................. G06Q 20/04
235/380
2010/0106611 A1* 4/2010 Paulsen ................ G06Q 20/102
705/26.1
(Continued)

OTHER PUBLICATIONS

Mobile payment security, threats, and challenges; Published in: 2016 Second International Conference on Mobile and Secure Services (MobiSecServ) (pp. 1-5); Authors: Yong Wang • Christen Hahn • Kruttika Sutrave [+details] (Year: 2016).*

(Continued)

*Primary Examiner* — Hani M Kazimi
*Assistant Examiner* — Hatem M Ali
(74) *Attorney, Agent, or Firm* — Troutman Pepper Hamilton Sanders LLP; Christopher J. Forstner; John A. Morrissett

(57) ABSTRACT

A system and method in accordance with exemplary embodiments may include systems and methods for providing fraud management, which may include, receiving account holder data, determining vertical spend patterns associated with merchants to define a merchant risk for each merchant, generating a transactional behavior patter for the account holder, and generating a fraud score and/or action set (e.g., refer/decline/queue for review) based on the transactional behavior pattern and merchant risk. Account holder data may include, for example, an account type, an account balance, account credits and debits, and transaction data including merchant name, location, and transaction details.

20 Claims, 9 Drawing Sheets

(51) Int. Cl.
*G06Q 20/32* (2012.01)
*G06Q 20/34* (2012.01)
*G06Q 20/20* (2012.01)

(58) Field of Classification Search
USPC .................................................. 705/35–44
See application file for complete search history.

(56) References Cited

U.S. PATENT DOCUMENTS

| | | | | |
|---|---|---|---|---|
| 2012/0041879 | A1* | 2/2012 | Kim | G06Q 20/40 705/44 |
| 2012/0290389 | A1* | 11/2012 | Greenough | G06Q 20/3224 705/14.53 |
| 2013/0041821 | A1* | 2/2013 | Kingston | G06Q 40/02 705/44 |
| 2013/0218697 | A1* | 8/2013 | Kingston | G06Q 20/405 705/21 |
| 2014/0058854 | A1* | 2/2014 | Ranganath | G06Q 20/4016 705/16 |
| 2014/0188723 | A1* | 7/2014 | Pacher | G06Q 20/401 705/43 |
| 2015/0134540 | A1* | 5/2015 | Law | G06Q 20/02 705/72 |
| 2018/0039975 | A1* | 2/2018 | Hefetz | G06Q 20/3224 |

OTHER PUBLICATIONS

Method and System for Detecting Possible Fraud in a Transaction; ip.com Disclosure No. IPCOM000244805D Publication Date: Jan. 18, 2016 (Year: 2016).*

An Application Security Framework for Near Field Communication; Published in: 2013 12th IEEE International Conference on Trust, Security and Privacy in Computing and Communications (pp. 396-403) (Year: 2013).*

Authors: Park et al: Leveraging Cellular Infrastructure to Improve Fraud Prevention; IEEE XPLORE; Publication Date: Dec. 1, 2009; Conference Start Date: Dec. 7, 2009 (Year: 2009).*

Authors Qi Li et al: Secure Mobile Payment via Trusted Computing: IEEE Conference Paper: IEEE XPLORE: Last Update Date: Feb. 9, 2009; Publication Date: Oct. 1, 2008; (Year: 2008).*

* cited by examiner

SYSTEM AND METHOD FOR FRAUD CONTROL

CROSS-REFERENCE TO RELATED APPLICATIONS

This application contains subject matter related to and claims the benefit of U.S. Provisional Patent Application No. 61/842,463, filed on Jul. 3, 2013, the entire contents of which is incorporated herein by reference.

FIELD OF THE DISCLOSURE

The present disclosure relates to systems and methods for using the technical capabilities of a mobile device to enable fraud control strategies and solutions.

BACKGROUND OF THE DISCLOSURE

Plastic cards provide little security. Also, card breaches can result in large groups of card numbers to be stolen. Thieves can then code a hotel key or other magnetic stripe with stolen card information and use it successfully at various points of sale, resulting in losses for the card issuer, merchant, and/or customer. Current fraud control solutions associated with magnetic stripe cards and other payment solutions are often unsuccessful and often provided in a post-fraudulent transaction setting.

These and other drawbacks exist.

SUMMARY OF THE DISCLOSURE

Various embodiments of the present disclosure provide systems and methods for using the technical capabilities of a mobile device to enable fraud control strategies and solution. In an exemplary embodiment, a method for providing fraud control and prevention may include, utilizing at least one fraud control module in order to manage fraud protection and proactively avoid fraudulent transactions. These fraud control modules may include, for example, a pre-authentication module, a transaction amount control module, a transaction account activation module, a user-defined spending module, a location-based transaction module, or any combination of the modules.

In one example embodiment, a system may include a fraud system associated with a financial institution that receives a fraud module selection for an account holder via a network, receives at least one fraud module variable associated with the selected fraud module, and receives account holder data; and a transaction processor connected to a merchant system that receive transaction data from the merchant system via a network, uses the transaction data to identify an account holder, retrieves account holder data from the financial institution, processes the retrieved account holder data and the received transaction data according to the at least one selected fraud module to determine a fraud module response, and transmits the fraud module response to a device associated with the account holder.

Also, a method may include receiving, at a fraud system associated with a financial institution, a fraud module selection for an account holder via a network, receiving, at the fraud system, at least one fraud module variable associated with the selected fraud module, receiving, at the fraud system, account holder data, identifying an account holder using the transaction data and a transaction processor connected to a merchant system that receive transaction data from the merchant system via a network, retrieving, using the transaction processor, account holder data from the financial institution, determining, using the transaction processor, the retrieved account holder data and the received transaction data according to the at least one selected fraud module, a fraud module response, and transmitting, via a network, the fraud module response to a device associated with the account holder.

The method may further include generating fraud control rules each fraud control module to use in order to provide definition and specificity to each fraud control module.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION OF THE EMBODIMENTS

The following description is intended to convey a thorough understanding of the embodiments described by providing a number of specific exemplary embodiments and details involving systems and methods for providing fraud control and prevention. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only.

According to the various embodiments of the present disclosure, systems and methods use the technical capabilities of a mobile device, for example, to enable fraud control and prevention. The systems and methods depicted in FIGS. 1 through 5 allow a financial institution to control and prevent fraudulent transactions using a fraud control system.

Figure 1:
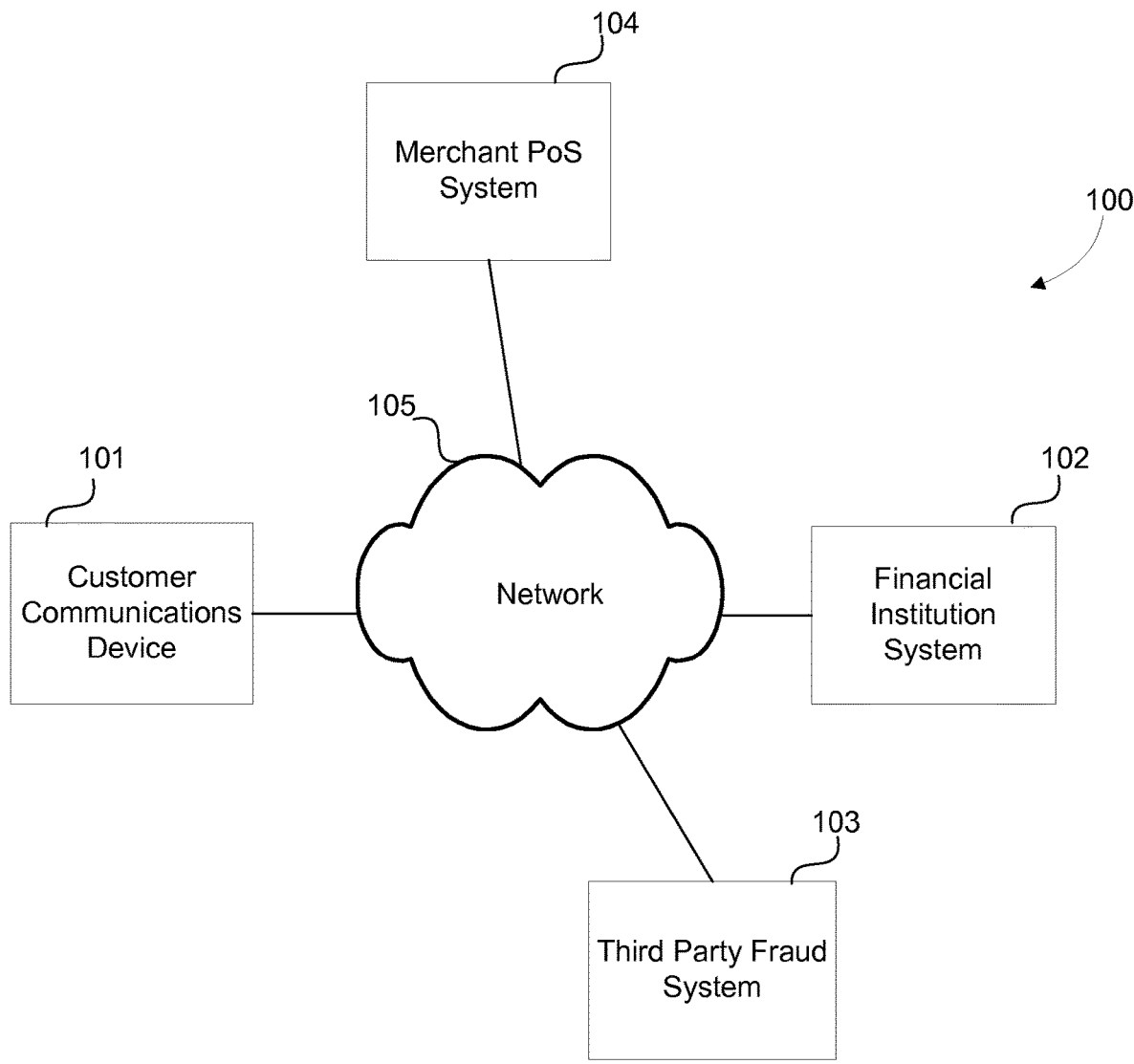
FIG. 1 depicts a fraud control system according to an exemplary embodiment.

FIG. 1 illustrates a fraud control system according to an example embodiment. The system 100 may include a customer communications device 101, a financial institution 102, a third party fraud system 103, and a merchant point-of-sale (PoS) system all connected over a network 105.

Network 105 may be one or more of a wireless network, a wired network or any combination of wireless network and wired network. For example, network 105 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 105 may include, without limitation, telephone lines, fiber optics, IEEE Ethernet 902.3, a wide area network ("WAN"), a local area network ("LAN"), or a global network such as the Internet. In addition, network 105 may support an Internet network, a wireless communication network, a cellular network, or the like, or any combination thereof. Network 105 may further include one network, or any number of the exemplary types of networks mentioned above, operating as a stand-alone network or in cooperation with each other. Network 105 may utilize one or more protocols of one or more network elements to which they are communicatively coupled. Network 105 may translate to or from other protocols to one or more protocols of network devices. Although network 105 is depicted as a single network, it should be appreciated that according to one or more embodiments, network 105 may comprise a plurality of interconnected networks, such as, for example, the Internet, a service provider's network, a cable television network, corporate networks, such as credit card association networks, and home networks.

A customer communications device 101, financial institution 102, third party fraud system 103, and a merchant PoS system 104 may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The network-enabled computer systems may further include data storage. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

A merchant system 104 may further include a Point of Sale (PoS) device and a payment processing system. In various embodiments, a PoS may be any device that may receive payment instructions from, for example, a magnetic stripe payment card, a secure chip technology payment card, an NFC communication device, or any other form of payment. PoS device may be for example, PoS devices made by VeriFone®, Ingenico, and/or any other like devices. A PoS device may also be any device capable of receiving and transmitting payment and transaction information from any payment method. By way of example, payment options may include mobile contactless payments, remote electronic payments, magnetic stripe payments, secure chip technology payments, person-to-person payments, and the like. In an exemplary embodiment, a PoS device may be capable of utilizing standardized transmission protocols, for example but not by way of limitation, ISO/IEC 14443 A/B, ISO/IEC 18092, MiFare, FeliCa, tag/smartcard emulation, and the like. Also, a PoS device may be able to utilize transmission protocols and methods that are developed in the future using other frequencies or modes of transmission. A PoS device may also be backwards-compatible with existing payment techniques, for example RFID. Also, the system may support transmission requirements to meet new and evolving payment standards including internet based transmission triggered by near-field communications (NFC).

Figure 6:
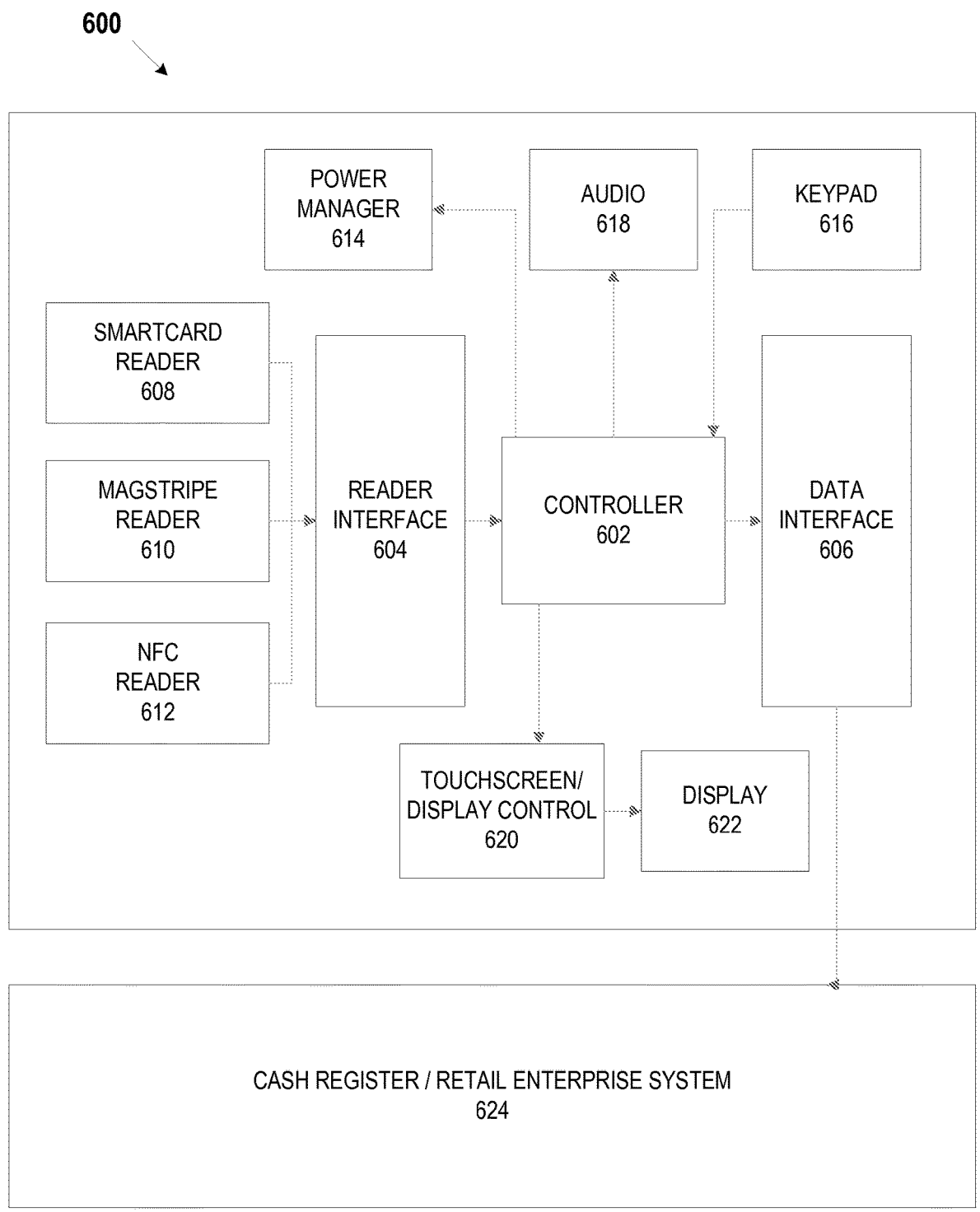
FIG. 6 depicts an example point of sale device associated with a fraud control system according to an example embodiment.

FIG. 6 depicts an example Point of Sale (PoS) device 600. PoS device 600 may provide the interface at what a customer or end user makes a payment to the merchant in exchange for goods or services. PoS device 600 may include and/or cooperate with weighing scales, scanners, electronic and manual cash registers, electronic funds transfer at point of sale (EFTPOS) terminals, touch screens and any other wide variety of hardware and software available for use with PoS device 600. PoS device 600 may be a retail point of sale system and may include a cash register and/or cash register-like computer components to enable purchase transactions. PoS device 600 also may be a hospitality point of sale system and include computerized systems incorporating registers, computers and peripheral equipment, usually on a computer network to be used in restaurant, hair salons, hotels or the like. PoS device 600 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 600 also may be a cloud-based point of sale system that can be deployed as software as a service, which can be accessed directly from the Internet using, for example, an Internet browser.

Referring to FIG. 6, an example PoS device 600 is shown. PoS device 600 may include a controller 602, a reader interface 604, a data interface 606, a smartcard reader 608, a magnetic stripe reader 610, a near-field communications (NFC) reader 612, a power manager 614, a keypad 616, an audio interface 618, a touchscreen/display controller 620, and a display 622. Also, PoS device 600 may be coupled with, integrated into or otherwise connected with a cash register/retail enterprise system 624.

In various embodiments, Controller 602 may be any controller or processor capable of controlling the operations of PoS device 600. For example, controller 602 may be a Intel® 2nd Generation Core™ i3 or i5 or Pentium™ G850 processor or the like. Controller 602 also may be a controller included in a personal computer, smartphone device, tablet PC or the like.

Reader interface 604 may provide an interface between the various reader devices associated with PoS device 600 and PoS device 600. For example, reader interface 604 may provide an interface between smartcard reader 608, magnetic stripe reader 610, NFC reader 612 and controller 602. In various embodiments, reader interface 604 may be a wired interface such as a USB, RS232 or RS485 interface and the like. Reader interface 604 also may be a wireless interface and implement technologies such as Bluetooth, the 802.11(x) wireless specifications and the like. Reader interface 604 may enable communication of information read by the various reader devices from the various reader devices to PoS device 600 to enable transactions. For example, reader interface 604 may enable communication of a credit or debit card number read by a reader device from that device to PoS device 600. In various embodiments, reader interface 604 may interface between PoS device 600 and other devices that do not necessarily "read" information but instead receive information from other devices.

Data interface 606 may allow PoS device 600 to pass communicate data throughout PoS device and with other devices including, for example, cash register/retail enterprise system 624. Data interface 606 may enable PoS device 600 to integrate with various customer resource management (CRM) and/or enterprise resource management (ERP) systems. Data interface 606 may include hardware, firmware and software that make aspects of data interface 606 a wired interface. Data interface 606 also may include hardware, firmware and software that make aspects of data interface 606 a wireless interface. In various embodiments, data interface 606 also enables communication between PoS device other devices.

Smartcard reader 608 may be any electronic data input device that reads data from a smart card. Smartcard reader 608 may be capable of supplying an integrated circuit on the smart card with electricity and communicating with the smart card via protocols, thereby enabling read and write functions. In various embodiments, smartcard reader 608 may enable reading from contact or contactless smart cards. Smartcard reader 608 also may communicate using standard protocols including ISO/IEC 7816, ISO/IEC 14443 and/or the like or proprietary protocols.

Magnetic stripe reader 610 may be any electronic data input device that reads data from a magnetic stripe on a credit or debit card, for example. In various embodiments, magnetic stripe reader 610 may include a magnetic reading head capable of reading information from a magnetic stripe. Magnetic stripe reader 610 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., ormat A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 612 may be any electronic data input device that reads data from a NFC device. In an exemplary embodiment, NFC reader 612 may enable Industry Standard NFC Payment Transmission. For example, the NFC reader 612 may communicate with a NFC enabled device to enable two loop antennas to form an air-core transformer when placed near one another by using magnetic induction. NFC reader 612 may operate at 13.56 MHz or any other acceptable frequency. Also, NFC reader 612 may enable a passive communication mode, where an initiator device provides a carrier field, permitting answers by the target device via modulation of existing fields. Additionally, NFC reader 612 also may enable an active communication mode by allowing alternate field generation by the initiator and target devices.

In various embodiments, NFC reader 612 may deactivate an RF field while awaiting data. NFC reader 612 may receive communications containing Miller-type coding with varying modulations, including 100% modulation. NFC reader 612 also may receive communications containing Manchester coding with varying modulations, including a modulation ratio of approximately 10%, for example. Additionally, NFC reader 612 may be capable of receiving and transmitting data at the same time, as well as checking for potential collisions when the transmitted signal and received signal frequencies differ.

NFC reader 612 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 612 may be able to utilize transmission protocols and methods that are developed in the future using other frequencies or modes of transmission. NFC reader 612 also may be backwards-compatible with existing payment techniques, such as, for example RFID. Also, NFC reader 612 may support transmission requirements to meet new and evolving payment standards including internet based transmission triggered by NFC. In various embodiments, NFC reader 612 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 614 may be any microcontroller or integrated circuit that governs power functions of PoS device 600. Power manager 614 may include, for example, firmware, software, memory, a CPU, a CPU, input/output functions, timers to measure intervals of time, as well as analog to digital converters to measure the voltages of the main battery or power source of PoS device 600. In various embodiments, Power manager 614 remain active even when PoS device 600 is completely shut down, unused, and/or powered by the backup battery. Power manager 614 may be responsible for coordinating many functions, including, for example, monitoring power connections and battery charges, charging batteries when necessary, controlling power to other integrated circuits within PoS device 600 and/or other peripherals and/or readers, shutting down unnecessary system components when they are left idle, controlling sleep and power functions (on and off), managing the interface for built-in keypad and trackpads, and/or regulating a real-time clock (RTC).

Keypad 616 may any input device that includes a set of buttons arranged, for example, in a block or pad and may bear digits, symbols and/or alphabetical letters. Keypad 616 may be a hardware-based or mechanical-type keypad and/or implemented in software and displayed on, for example, a screen or touch screen to form a keypad. Keypad 616 may receive input from a user that pushed or otherwise activates one or more buttons on keypad 616 to provide input.

Audio interface 618 may be any device capable of providing audio signals from PoS device 600. For example, audio interface may be a speaker or speakers that may produce audio signals. In various embodiments, audio interface 618 may be integrated within PoS device 600. Audio interface 618 also may include components that are external to PoS device 600.

Touchscreen/display control 620 may be any device or controller that controls an electronic visual display. Touchscreen/display control 620 may allow a user to interact with PoS device 600 through simple or multi-touch gestures by touching a screen or display (e.g., display 622). Touchscreen/display control 620 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 620 may receive inputs from the touchscreen and process the received inputs. Touchscreen/display control 620 also may control the display on PoS device 600, thereby providing the graphical user interface on a display to a user of PoS device 600.

Display 622 may be any display suitable for a PoS device. For example, display 622 may be a TFT, LCD, LED or other display. Display 622 also may be a touchscreen display that for example allows a user to interact with PoS device 600 through simple or multi-touch gestures by touching a screen or display (e.g., display 622). Display 622 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 622 may receive inputs from control gestures provided by a user. Display 622 also may display images, thereby providing the graphical user interface to a user of PoS device 600.

Cash register/retail enterprise system 624 may me any device or devices that cooperate with PoS device 600 to process transactions. Cash register/retail enterprise system 624 may be coupled with other components of PoS device 600 via, for example, a data interface (e.g., data interface 606) as illustrated in FIG. 6. Cash register/retail enterprise system 624 also may be integrated into PoS device 600.

In various embodiments, cash register/retail enterprise system 624 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 624 may comprise an retail enterprise system and/or a customer relationship management system. Retail enterprise system 624 may enable retain enterprises to manage operations and performance across a retail operation. Retail enterprise system 624 may be a stand-alone application in, for example, individual stores, or may be interconnected via a network. Retail enterprise system 624 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 624 also may include inventory control and tracking capabilities, reporting tools, customer management capabilities, employee management tools, and may integrate with other accounting software.

In various embodiments cash register/retail enterprise system 624 may be a hospitality PoS. In such embodiments, retail enterprise system 624 may include hospitality PoS software (e.g, Aloha PoS Restaurant software from NCR®, Micros® RES and Symphony software and the like), hospitality management software, and other hardware and software to facilitate hospitality operations.

Figure 7:
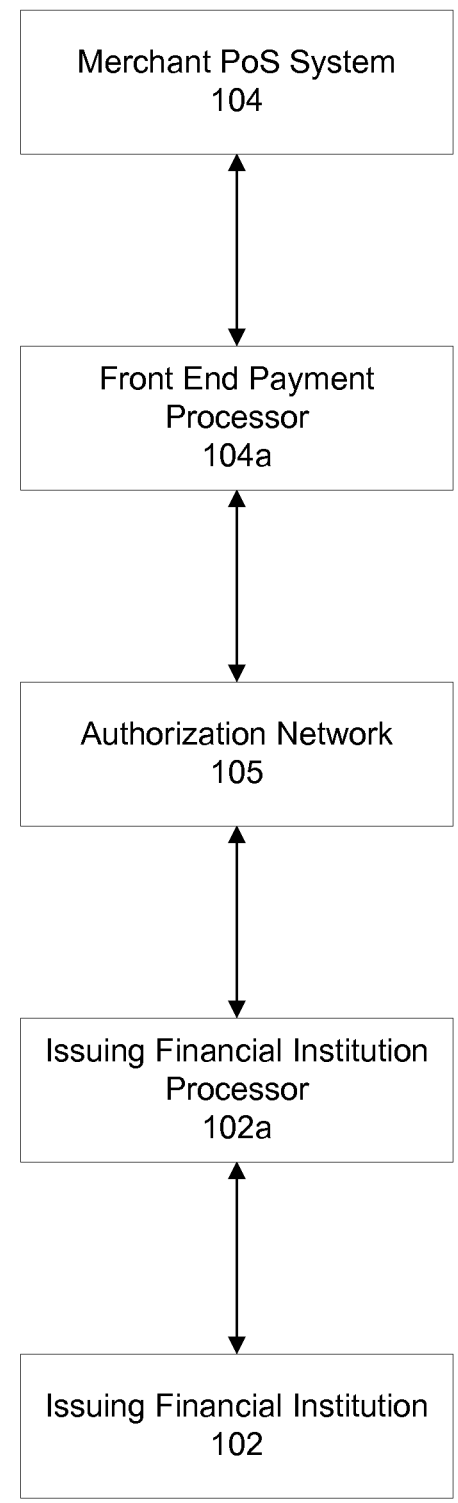
FIG. 7 depicts an authorization system in accordance with an example embodiment.

As illustrated in FIG. 7 for example, payment processing system may allow merchant to submit payment authorization requests and process payments. An authorization network 105 may be used to communicate payment requests from a merchant system 104 to an issuing financial institution 102 as well as payment and/or fraud determinations from the issuing financial institution 102 to the merchant system 104. In communicated payment requests, payment processing system 104 may pass transaction information, which includes payment information, to a front-end payment processor 104a that maintains connections with a variety of networks 105 connected to financial institutions 102, such as card associations, banking institutions, and other settlement service providers. The front-end payment processor may pass along the transaction information to the appropriate network 105, which may then route the transaction information to the issuing financial institution processor (or a back-end payment processor) 102a. The issuing financial institution processor 102a may check the details received as well as carry out a variety of anti-fraud measures disclosed herein. The issuing financial institution 102 may concurrently, or in response to the anti-fraud measure check, verify a payment for the received transaction information. Where a verification of payment by a financial institution 102 happens in response to anti-fraud processing at the financial institution processor 102a, and the financial institution's processor 102 detects a fraud condition has been met and the transaction requires further approval by an account holder as disclosed herein, the issuing financial institution processor 102a may transmit the anti-fraud response through the network 105 and front-end payment processor 104a to the merchant system 104. Alternatively, the issuing financial institution processor 102a, upon detection of a fraud condition, may transmit a request for further approval from the account holder through a network 105 to a device associated with the account holder 101. The account holder may then transmit the approval using the account holder device 101 through a network 105 to the issuing financial institution processor 102a, where the anti-fraud measurement check may continue and/or conclude. Once the anti-fraud check 308 has been performed and all fraud conditions are either null or have been approved by the account holder, the verification of payment from the issuing financial institution 102 may be sent via the issuing financial institution processor 102a through the network 105 and front-end processor 104a to the merchant system 104.

The authorization system illustrated in FIG. 7 may be used to both perform real-time authorization as well as batch payment processing. In a batch payment processing system, the issuing financial institution processor 102a may perform an anti-fraud determination and may request approval by the account holder as described above in real-time, which the payment processing and verification at the issuing financial institution 102 may occur subsequently in batch processing.

Figure 8:
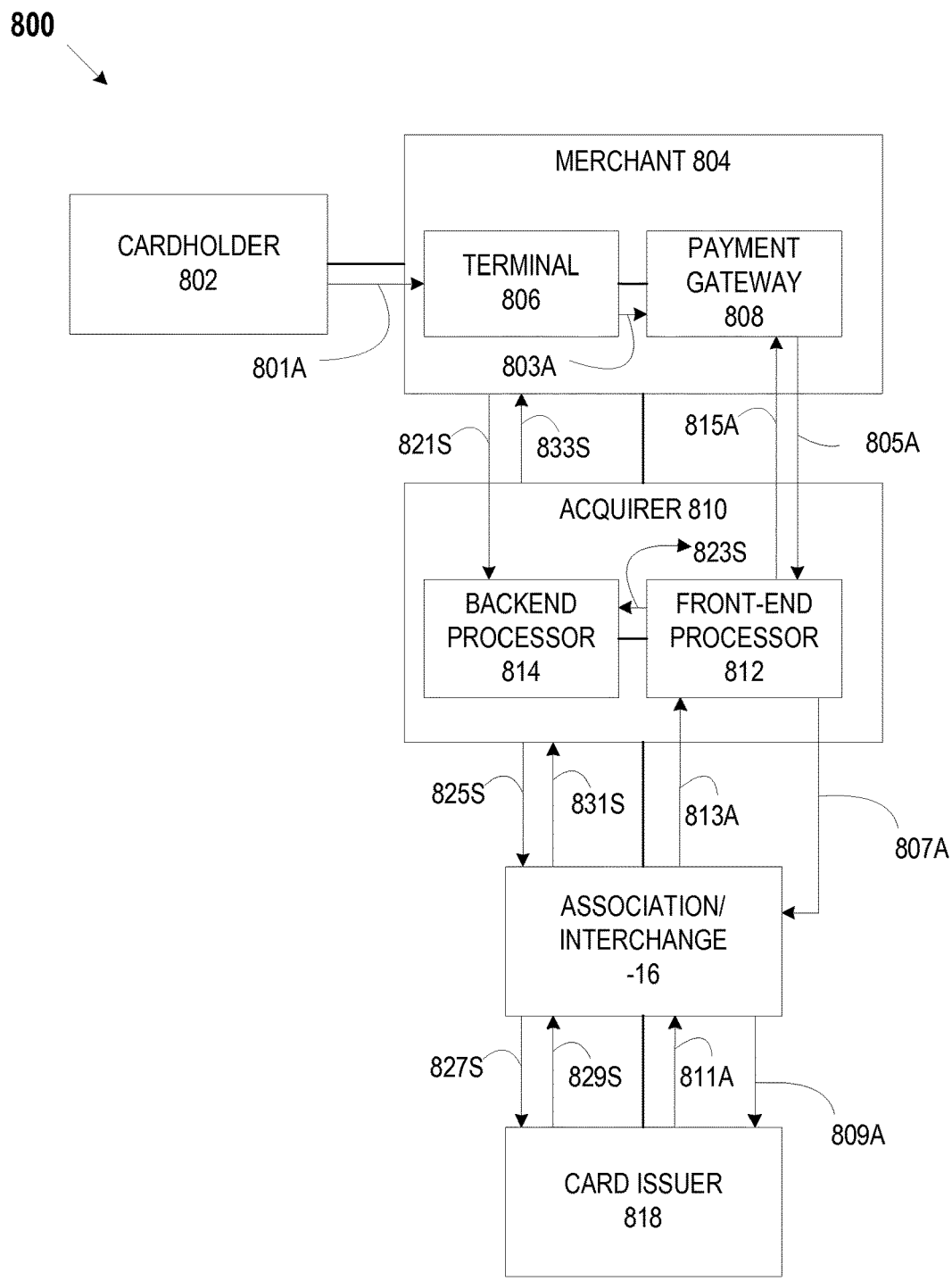
FIG. 8 depicts an authorization system in accordance with an example embodiment.

FIG. 8 illustrates an example system 800 and method for card authorization. As shown and described in FIG. 8, merchants, cardholders and financial institutions may be connected with a card association network to enable secure transactions and timely payments. System 800 may include a cardholder 802, merchant 804, Acquirer 810, Association/Interchange 816, and card issuer 818.

Cardholder 802 may be any card holder, including a credit card holder, debit card holder, stored value card holder and the like. Cardholder 802 may possess a plastic card or carry a device (e.g., a mobile device) that securely stores card credentials and is capable of transmitting the card credentials to, for example, a PoS terminal (e.g., terminal 806). Cardholder 802 may interact with a merchant (e.g., merchant 804) by presenting a card or card credentials to a terminal (e.g., terminal 806).

Merchant 804 may be any merchant that accepts payment from a cardholder, for example. Merchant 804 may be any retailer, service provider, business entity, or individual that accepts payments. Merchant 804 may include software, firmware and hardware for accepting and/or processing payments. For example, as illustrated in FIG. 8, merchant 804 may include a terminal 806 and a payment gateway 808. Terminal 806 and payment gateway 808 may comprise the physical or virtual device(s) used by merchant 804 to communicate information to front-end processor 812 of acquirer 810. Terminal 806 may be similar to PoS system [Y00] as shown and described in Figure Y. In various embodiments, payment gateway 808 may be an e-commerce application service provider service that authorizes payments for merchants. As such, payment gateway 808 may be a virtual equivalent of a PoS terminal and interface with, for example, a billing system of merchant 804 and pass data to front-end processor 812 of acquirer 810.

Acquirer 810 may be, for example, a financial institution or bank, that holds the contract for providing payment processing services to merchant 804. Merchant 804 may have a merchant account that may serve as a contract under which Acquirer 810 may extend a line of credit to a merchant who wishes to accept, for example, credit card transactions. As shown in FIG. 8, Acquirer 810 may be associated with front-end processor 812 and back-end processor 814.

In various examples, front-end processor 812 may be a platform that card terminal 806 and/or payment gateway 808 communicate with when approving a transaction. Front-end processor 812 may include hardware, firmware, and software to process transactions. Front-end processor 812 may be responsible for the authorization and capture portion of credit card transaction. Front-end processor 812 also may include additional front-end platform interconnections to support, for example, ACH and debit transactions.

Backend processor 814 may be a platform that takes captured transactions from front-end processor 812 and settles them through an Interchange system (e.g., association/interchange 816). Back-end processor 814 may generate, for example, daily ACH files for merchant settlement. Back-end processor 814 also may handle chargeback handling, retrieval request and monthly statements.

Association/interchange 816 may be the consumer payment system whose members are the financial institutions that issue payment cards and/or sign merchant to accept payment cards. Example associations/interchanges 816 may include, Visa®, MasterCard®, and AmericanExpress®. Association/interchange 816 may include one or more computer systems and networks to process transactions.

Issuer 818 may be a financial institution that issues payment cards and maintains a contract with cardholders for repayment. In various embodiments, issuer 818 may issue credit, debit, and/or stored value cards, for example. Example issuers may include, Capital One, Bank of America, Citibank, and the like.

In various embodiments, processing a payment card transaction may involves two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 802 may present payment card as payment (801A) at merchant 804 PoS terminal 806, for example. Merchant 804 may enter card into a physical PoS terminal 806 or submit a credit card transaction to a payment gateway 808 on behalf of cardholder 802 via secure connection from a Web site, retail location, or a wireless device.

Payment gateway 808 may receive the secure transaction information (803A) and may pass the secure transaction information (805A) via a secure connection to the merchant acquirer's 810 front-end processor 812.

Front-end processor 812 may submit the transaction (807A) to association/interchange 816 (e.g., a network of financial entities that communicate to manage the processing, clearing and settlement of credit card transactions). Association/interchange 816 may route the transaction (809A) to the customer's Issuer 818. Issuer 818 may approve or decline the transaction and passes the transaction results back (811A) through association/interchange 816. Association/interchange then may relay the transaction results (813A) to front-end processor 812.

Front-end processor 812 may relay the transaction results (815A) back to the payment gateway 808 and/or terminal 806. Payment gateway 808 may store the transaction results and sends them to merchant 804. Merchant 804 may receive the authorization response and complete the transaction accordingly.

During settlement, merchant 804 may deposit the transaction receipt (821S) with acquirer 810 via, for example, a settlement batch. Captured authorizations may be passed (823S) from front-end processor 812 to the back-end processor 814 for settlement. Back-end processor may generates ACH files for merchant settlement. Acquirer may submit settlement files (825S, 827S) to Issuer 818 for reimbursement via association/interchange 816. Issuer 818 may post the transaction and pay merchant 804 (829S, 831S, 833S).

Referring back to FIG. 1, a customer communications device 101 may include a module device capable of executing a payment and/or receiving notifications from an account provider. For example, a mobile device could be an iPhone, iPod, iPad from Apple® or any other mobile device running Apple's iOS operating system, any device running Google's Android® operating system, any device running Microsoft's Windows® Mobile operating system, and/or any other smartphone or like device.

Figure 2:
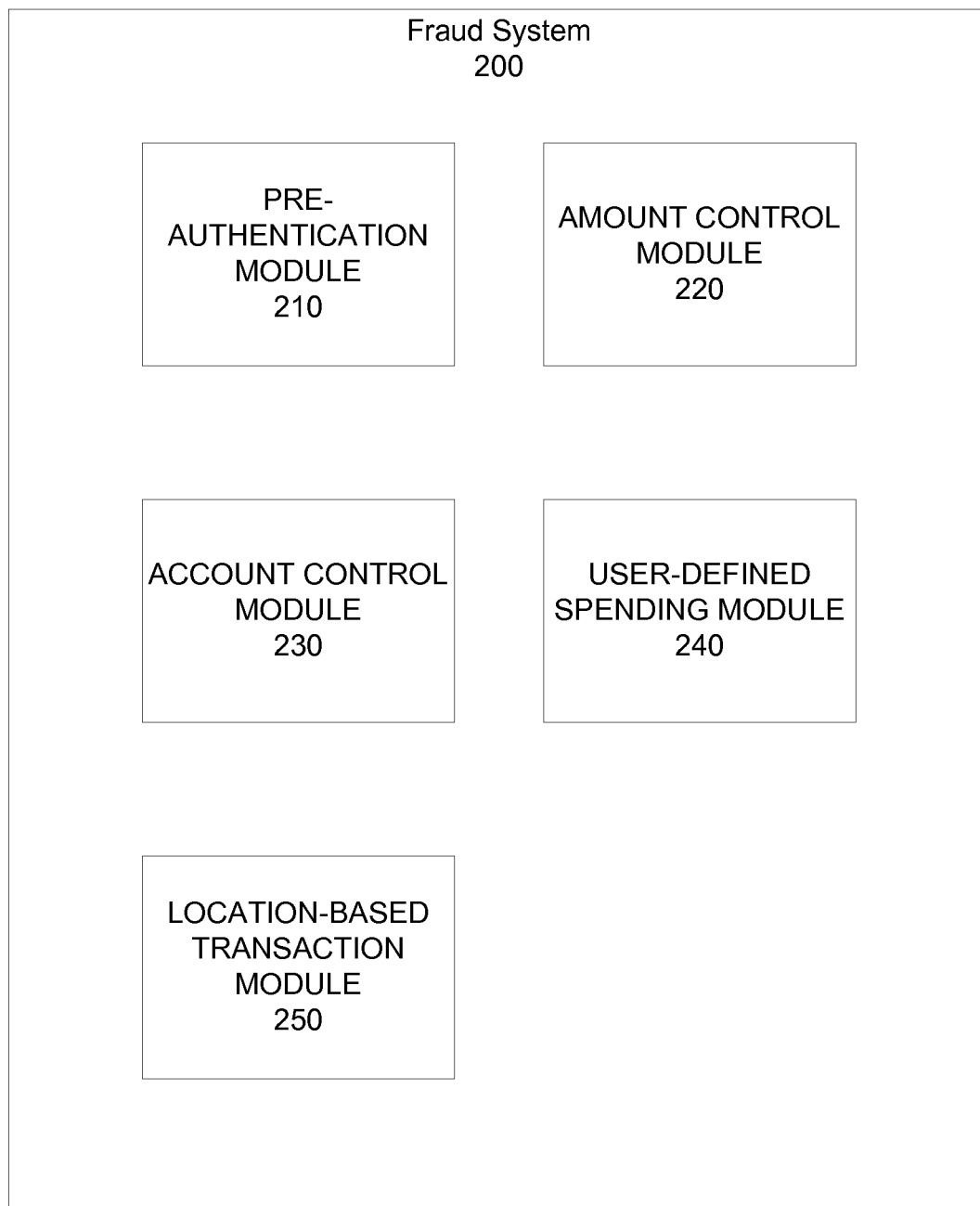
FIG. 2 depicts a fraud control system and fraud control modules according to an exemplary embodiment.

A financial institution 102 or a third party fraud system 103 may include various modules to perform fraud control and prevention as depicted in FIG. 2. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

Figure 9:
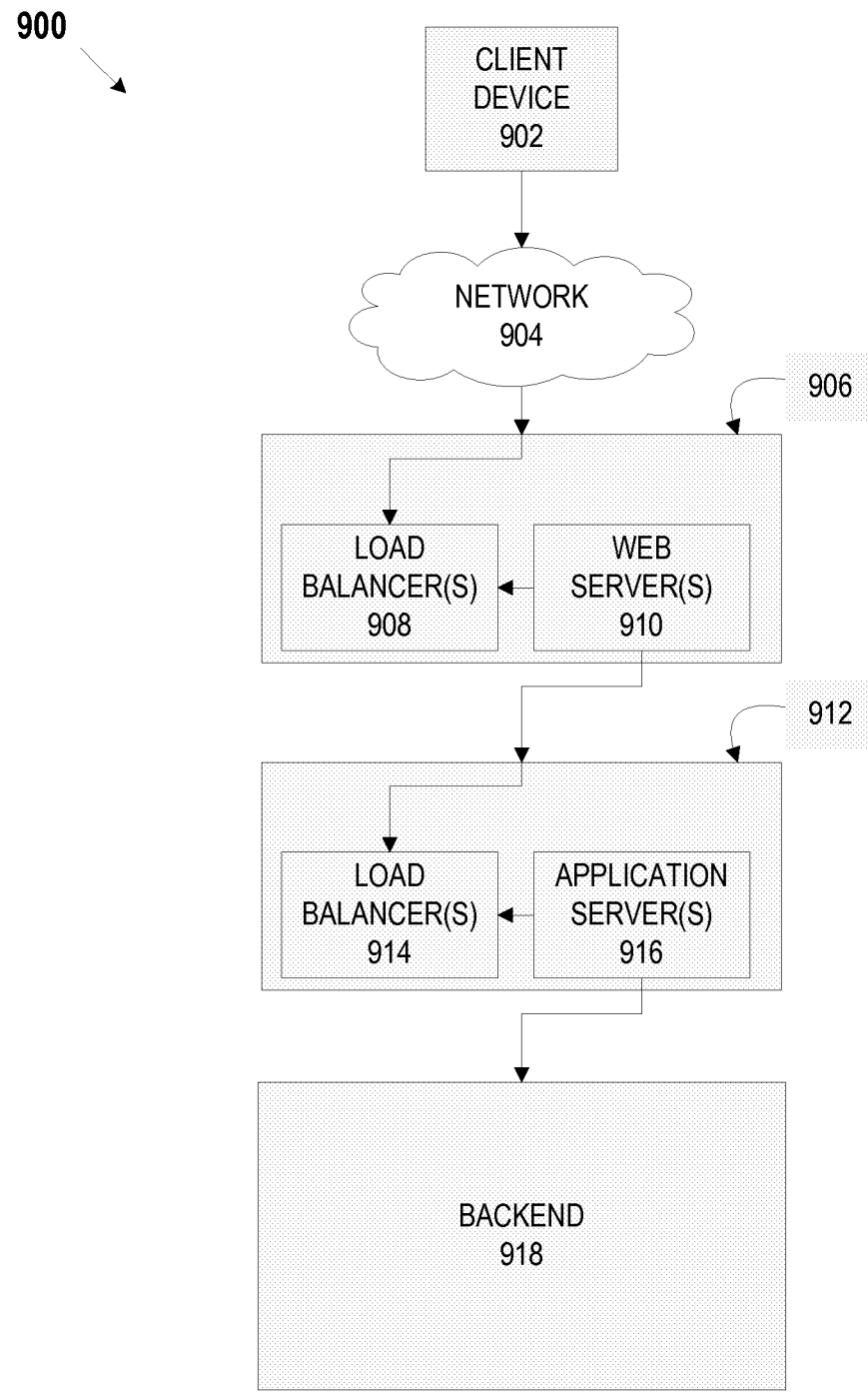
FIG. 9 depicts a financial institution that implements a fraud system in accordance with an example embodiment.

FIG. 9 depicts an example system 900 that may enable a financial institution, for example, to provide network services to its customers. For example, system 900 may enable fraud control and prevention. As shown in FIG. 9, system 900 may include a client device 902, a network 904, a front-end controlled domain 906, a back-end controlled domain 912, and a backend 918. Front-end controlled domain 906 may include one or more load balancers 908 and one or more web servers 910. Back-end controlled domain 912 may include one or more load balancers 914 and one or more application servers 916.

Client device 902 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 900 may execute one or more software applications to enable, for example, network communications.

Client device 902 also may be a mobile device: For example, a mobile device may include an iPhone, iPod, iPad from Apple® or any other mobile device running Apple's iOS operating system, any device running Google's Android® operating system, including, for example, Google's wearable device, Google Glass, any device running Microsoft's Windows® Mobile operating system, and/or any other smartphone or like wearable mobile device.

Network 904 may be one or more of a wireless network, a wired network, or any combination of a wireless network and a wired network. For example, network 904 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 904 may include, without limitation, telephone lines, fiber optics, IEEE Ethernet 902.3, a wide area network (WAN), a local area network (LAN) or a global network such as the Internet. Also, network 904 may support an Internet network, a wireless communication network, a cellular network, or the like, or any combination thereof. Network 904 may further include one network, or any number of example types of networks mentioned above, operating as a stand-alone network or in cooperation with each other. Network 904 may utilize one or more protocols of one or more network elements to which they are communicatively couples. Network 904 may translate to or from other protocols to one or more protocols of network devices. Although network 904 is depicted as a single network, it should be appreciated that according to one or more embodiments, network 904 may comprise a plurality of interconnected networks, such as, for example, the Internet, a service provider's network, a cable television network, corporate networks, and home networks.

Front-end controlled domain 906 may be implemented to to provide security for backend 918. Load balancer(s) 908 may distribute workloads across multiple computing resources, such as, for example computers, a computer cluster, network links, central processing units or disk drives. In various embodiments, load balancer(s) 910 may distribute workloads across, for example, web server(S) 916 and/or backend 918 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 908 may include software that monitoring the port where external clients, such as, for example, client device 902, connect to access various services of a financial institution, for example. Load balancer(s) 908 may forward requests to one of the application servers 916 and/or backend 918 servers, which may then reply to load balancer 908. This may allow load balancer(s) 908 to reply to client device 902 without client device 902 ever knowing about the internal separation of functions. It also may prevent client devices from contacting backend servers directly, which may have security benefits by hiding the structure of the internal network and preventing attacks on backend 918 or unrelated services running on other ports, for example.

A variety of scheduling algorithms may be used by load balancer(s) 908 to determine which backend server to send a request to. Simple algorithms may include, for example, random choice or round robin. Load balancers 908 also may account for additional factors, such as a server's reported load, recent response times, up/down status (determined by a monitoring poll of some kind), number of active connections, geographic location, capabilities, or how much traffic it has recently been assigned.

Load balancers 908 may be implemented in hardware and/or software. Load balancer(s) 908 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 910 may include hardware (e.g., one or more computers) and/or software (e.g., one or more applications) that deliver web content that can be accessed by, for example a client device (e.g., client device A 902) through a network (e.g., network 904), such as the Internet. In various examples, web servers, may deliver web pages, relating to, for example, online banking applications and the like, to clients (e.g., client device 902). Web server(s) 910 may use, for example, a hypertext transfer protocol (HTTP or sHTTP) to communicate with client device 902. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 910 may respond with the content of that resource or an error message if unable to do so. The resource may be, for example a file on stored on backend 918. Web server(s) 910 also may enable or facilitate receiving content from client device 902 so client device 902 may be able to, for example, submit web forms, including uploading of files.

Web server(s) also may support server-side scripting using, for example, Active Server Pages (ASP), PHP, or other scripting languages. Accordingly, the behavior of web server(s) 910 can be scripted in separate files, while the actual server software remains unchanged.

Load balancers 914 may be similar to load balancers 908 as described above.

Application server(s) 916 may include hardware and/or software that is dedicated to the efficient execution of procedures (e.g., programs, routines, scripts) for supporting its applied applications. Application server(s) 916 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 916 may act as a set of components accessible to, for example, a financial institution or other entity implementing system 900, through an API defined by the platform itself. For Web applications, these components may be performed in, for example, the same running environment as web server(s) 910, and application servers 916 may support the construction of dynamic pages. Application server(s) 916 also may implement services, such as, for example, clustering, fail-over, and load-balancing. In various embodiments, where application server(s) 916 are Java application servers, the web server(s) 916 may behaves like an extended virtual machine for running applications, transparently handling connections to databases associated with backend 918 on one side, and, connections to the Web client (e.g., client device 902) on the other.

Backend 918 may include hardware and/or software that enables the backend services of, for example, a financial institution or other entity that maintains a distributes system similar to system 900. For example, backend 918 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a fraud control and prevention system (e.g., fraud system 200) and the like. Backend 918 may be associated with various databases, including account databases that maintain, for example, customer account information, product databases that maintain information about products and services available to customers, content databases that store content associated with, for example, a financial institution, and the like. Backend 918 also may be associated with one or more servers that enable the various services provided by system 900.

Referring now to FIG. 2, as illustrated therein, a fraud system 200, which may be housed within a financial institution 102, an issuing financial intuition processor 102a, or a third party fraud system 103, may include a pre-authentication module 210, an amount control module 220, an account control module, a user-defined spending module 240, and a location-based transaction module 250. With reference to the modules and rules specified in the modules, an account holder may include either the owner of the account or an issuing entity that provides the form of payment associated with the account. In this manner for example, a business issuing a business credit card or a family member issuing a second credit card associated with the same account may specify rules and modules to control fraudulent payments associated with the account.

A pre-authentication module 210 may include various rules to result in a pre-authentication alert sent to a user communication device 101 prior to authenticating the use of a financial institution account to make a purchase. These rules may be stored in, for example, a database associated with fraud system 200. For example, a user communication device 101 may be pre-defined as the communication device 101 associated with the account holder of a magnetic stripe card. Upon presenting the magnetic stripe card for payment at a merchant system 104, the pre-authentication module may detect the magnetic stripe card as being used for a transaction and, in response, transmit an alert to the user communication device 101 associated with the account holder. The alert, which may be based on one or more rules, may require that the account holder associated with the communications device 101 make a selection on the communication device 101 to confirm or deny the transaction. In this example, the rule may be defined to require the user to press an "authorize transaction button" on a mobile device associated with the user account before authorizing the transaction. Also, the alert may include a prompt for a user to input a PIN or password associated with the account, and upon entry of the correct PIN or password, the transaction may proceed to authentication. In this example, the rule may be defined to require entry of a PIN on a mobile device associated with the user account before authorizing the transaction. The pre-authentication module 210 may also require the account holder to select whether all transaction or a specified subset of transactions must be pre-authenticated by the user via a communications device 101. This selection may be translated into an appropriate rule in the pre-authentication module 210 to determine whether a transaction requires pre-authentication.

While a magnetic stripe card is used in various example, a form of payment may include mobile contactless payments, remote electronic payments, magnetic stripe payments, secure chip technology payments, person-to-person payments, and/or the like.

An amount control module 220 may include various rules to determine whether a transaction requires account holder approval associated with the amount of the transaction. These rules may be stored in, for example, a database associated with fraud system 200. For example, an amount control module 220 may require that an account holder pre-define an amount to associate with transaction that require account holder approval using a user communications device 101. By way of example, an account holder may specify that transactions over $100 require account holder approval. When a transaction over $100 is attempted with a form of payment linked to the account (e.g., credit card, debit card, mobile wallet), the amount control module may determine that the transaction requires further authorization and transmit an alert to the user communication device 101 associated with the account holder. The alert may allow the account holder to confirm or deny the transaction using a communication device 101 associated with that account holder.

An account control module 230 may include various rules to determine whether an account used during a transaction is active. These rules may include day and time of activation or deactivation. These rules may be stored in, for example, a database associated with fraud system 200. For example, a user may specify that a form of payment linked to an account (e.g., credit card, debit card, mobile wallet) may be inactive between the hours of 9:00 p.m. and 6:00 a.m. or on specific dates or days of the week. When a transaction is attempted during inactive hours, days, or dates, an alert may be transmitted to the user device 101 associated with the account holder. Accordingly, the account holder, through the user device 101, may confirm or deny the transaction.

Also, an account control module 230 may include rule to determine whether an account is active or inactive based on event activities. For example, an account may become inactive on a specific date or at a specific balance, and may remain inactive until another event occurs, such as the receipt of a paycheck to the account if the account is a direct deposit account, or the receipt of a payment if the account is, for example, a credit account. When a transaction is attempted on an inactive account, fraud system 200 may operate to decline the transaction. Fraud system 200 also may operate to initiate an exceptions processing which could transmit an alert to communications device 101 that a transaction is being attempted on an inactive account and attempt to resolve the inactive status through various communications with communication device 101.

A user-defined spending module 240 may include various rules to determine whether an account used during a transaction has met a user-defined spending limit. These rules may include variables such as a daily, weekly, monthly, or yearly spending limit that may be defined by an account holder. The account user may establish these user-defined limits using, for example, an online web tool (e.g., an online banking site) and/or a mobile banking application. Once, defined, these limits may be stored in, for example, a database associated with fraud system 200 and associated with user-defined spending limit rules. For example, an account holder may specify a weekly spending limit of $200. When a transaction is attempted at a merchant system 104 that would result in exceeding the user-specified spending limit, an alert may be sent to the user device 101 associated with the account holder. Accordingly, the account holder, through the user device 101, may confirm or deny the transaction.

A location-based transaction module 250 may include various rules to determine whether an account used during a transaction is within a pre-defined location. These rules may include location variables such as a country, state, county, city, zip code, or other form of a location identifier to determine whether a transaction is within the defined location variable. Location-based transaction module 250 may also include rules based on variables such as merchant location, for example, merchant name, merchant ID number, or other merchant identifying information to determine at what merchant the account is being used. To implement various location-based rules, location-based transaction module 250 may compare GPS data it receives with stored location-based parameters to determine whether the communication device is within an acceptable area.

Where the account used during a transaction is a mobile wallet account, a location-based transaction module 250 may interact with, for example, the GPS unit associated with the user communication device 101 on which the mobile wallet being used is housed, an IP address associated with a local Internet connection to which the communication device 101 is connected, and/or any other data housed or available to the communication device 101 for determining a location of the communication device 101. Additional location-based data housed or available to the communication device 101 for determining a location of the communication device 101 may include crowdsourced Wifi data, radio signals from radio tower(s) of the network 105, signal strength associated with the network(s) 105, and radio measurements from the communications device 101, such as the serving cell ID, round trip time, and signal strength. Additionally, the merchant system 104 may transmit location data to the fraud system 200. In use, a location-based transaction module 250 may, for example, allow an account holder to specify that an account may not be used outside of State A. Where a transaction is attempted in State B, an alert may be sent to the user device 101 associated with the account holder. Accordingly, the account holder, through the user device 101, may confirm or deny the transaction.

Each of the above modules may be used separately or in combination, depending on account holder rules. For example, an account holder may desire to have a user-defined weekly spending limit, inactivate an account on Sundays, and require authentication for all transactions over $200. A financial institution also may obligate an account holder to have the weekly spending limit as a condition to having the account. In this instance, the amount control module 220, account control module 230, and/or the user-defined spending module 240 may be invoked concurrently.

Furthermore, while the above description illustrates an account holder providing account holder defined rules to the modules, an issuing financial institution and/or merchant may also set up similar rules. For example, a merchant may desire that all transaction be pre-authenticated. Accordingly, a merchant may, through a merchant system 104 and/or communications device 101, set up various rules to result in a pre-authentication alert sent to a user communication device 101 associated with the account holder attempting a purchase prior to authenticating the use of a financial institution account to make a purchase. In another example, a financial institution may desire that all transactions outside of the United States be determined to contain a fraud condition that may either require account holder approval using a communication device 101 associated with the account holder or may be denied as fraudulent transactions. Accordingly, a financial institution may, through an issuing financial institution system 102, an issuing financial institution processor 102*a*, and/or a communications device 101, set up various rules to determine whether an account used during a transaction is within a pre-defined location (i.e., the United States).

Figure 3:
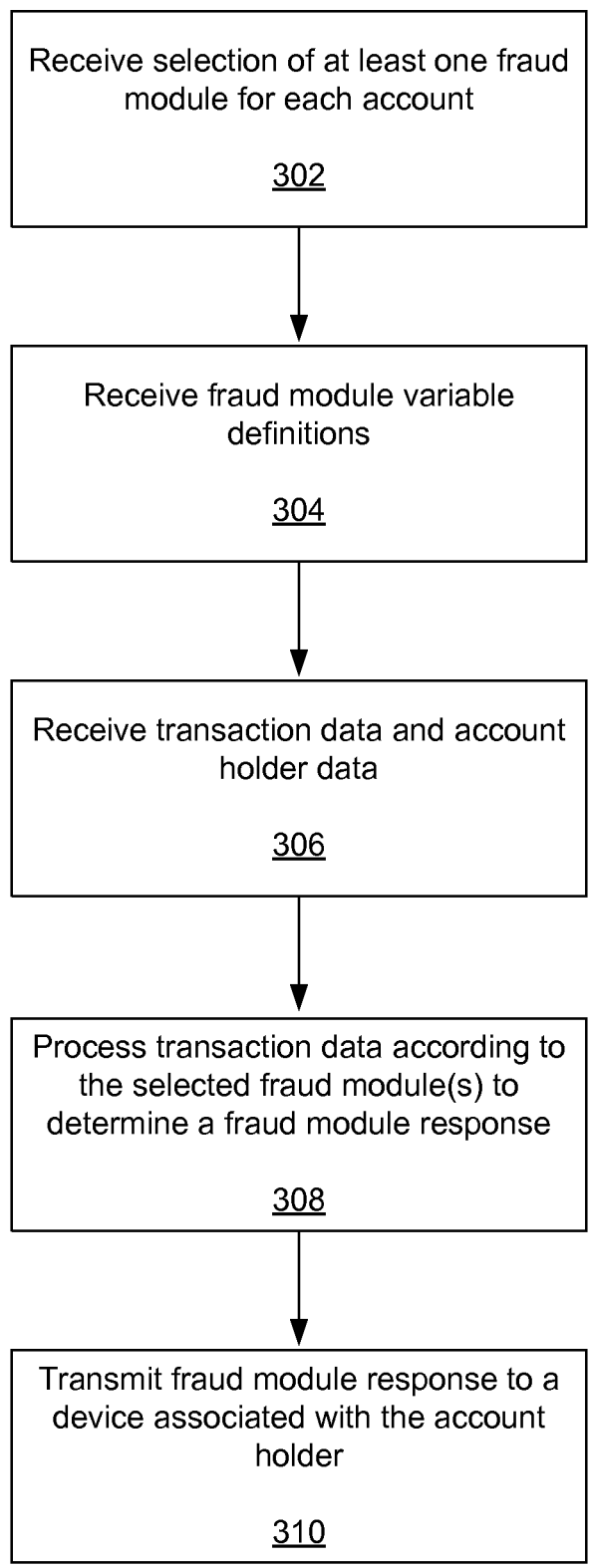
FIG. 3 depicts a method of fraud control according to an exemplary embodiment.

FIG. 3 illustrates an exemplary method of using the technical capabilities of a mobile device to enable fraud control and prevention 300. According to the method 300, at block 302, a fraud system 200 may receive a selection by an account holder to utilize a particular fraud module, such as those modules described in FIG. 2. In block 302, fraud system 200 also may receive input from a financial institution requiring use of a particular fraud module for an account. At block 304, the account holder and/or a financial institution associated with the account holder may define the required variables for the rules of the selected fraud module. For example, an account holder may define the spending limit variable for the spending limit rule in the user-defined spending module. In block 304, a financial institution also may define a spending limit rule in the spending module. For example, the financial institution may define the spending limit variable for the spending limit rule in the spending module to prevent transactions over $100 from being authorized without fraud control mechanisms as described herein. In block 304, the user and/or the financial institution also may define location-based variables to be used in fraud prevention. These location-based variables may define or be used to establish rules for, for example, geographic regions where transactions may be authorized or not. The location-based variables also may define or be used to establish rules for, for example, geographic regions requiring authorization via a communication device. For example, the location-based variables may be used to restrict all transaction outside of the United States or require authorization via a communications device. Once all desired modules and variables have been selected and defined by the account holder and or the financial institution as described above with respect to FIG. 2, the fraud system 200 may actively control and prevent fraud.

At block 306, the fraud system may receive transaction data associated with an attempted transaction as well as account holder data. The account holder data may be received from the financial institution system 102, where the account is maintained. Attempted transaction data may be used to identify account holder data. For example, a credit card number that is part of the attempted transaction data may be used to identify an account at the financial institution and retrieve account holder data. Account holder data may include, for example, account holder name, address(es), company, telephone number(s), alias, account balance, account available funds, and account associates or other individuals that may be allowed to use the account. Atempted transaction data may include, for example, a credit card, debit card or other account identifier, a transaction amount, a merchant name, a merchant location, and a date and time of transaction.

At block 308, upon receipt of the transaction data and account holder data, the fraud system 200 may process the transaction data according to the selected fraud module(s) to determine a fraud module response. For example, fraud system 200 may provide the account holder data and attempted transaction data to one or more of the fraud modules to determine a fraud module response. Each of the fraud modules may compare the account holder data and attempted transaction data to respective fraud variables and/or analyze the account holder data and attempted transaction data against stored rules to determine a fraud response. Where, for example, a fraud module detects that account holder approval is needed for a particular transaction, the fraud system 200 may transmit a fraud module response to a communications device 101 associated with the account holder at block 310. For example, in block 310, fraud system 200 may transmit an alert to a communications device 101 and await a confirmation and/or other authorization response from the communications device. Once the confirmation and/or authorization response is received, the fraud system may authorize the transaction. Fraud system 200 also may transmit a notification to a communication device that may or may not require a response.

Figure 4:
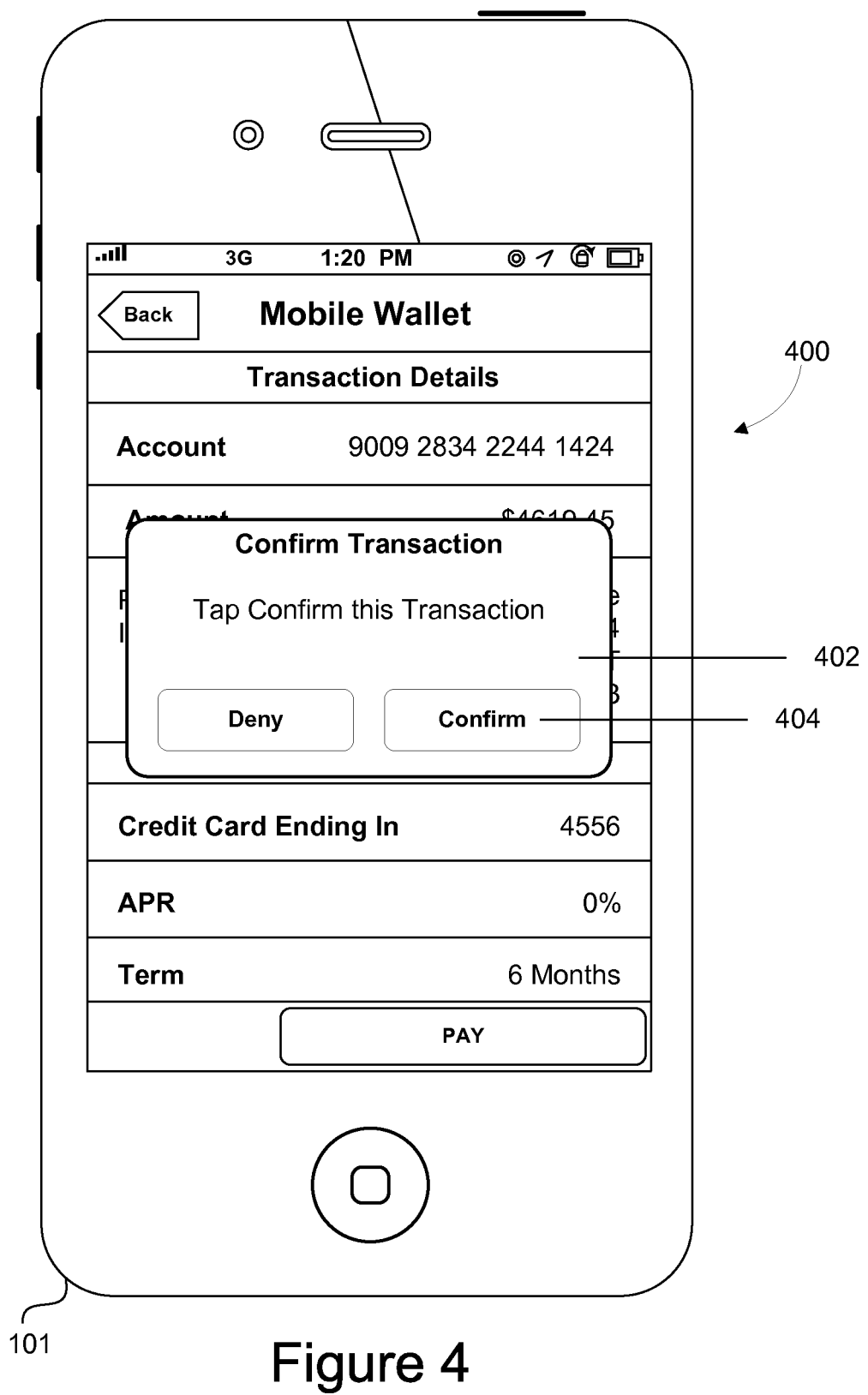
FIG. 4 depicts a screen shot of a mobile device associated with a fraud control system according to an exemplary embodiment.
Figure 5:
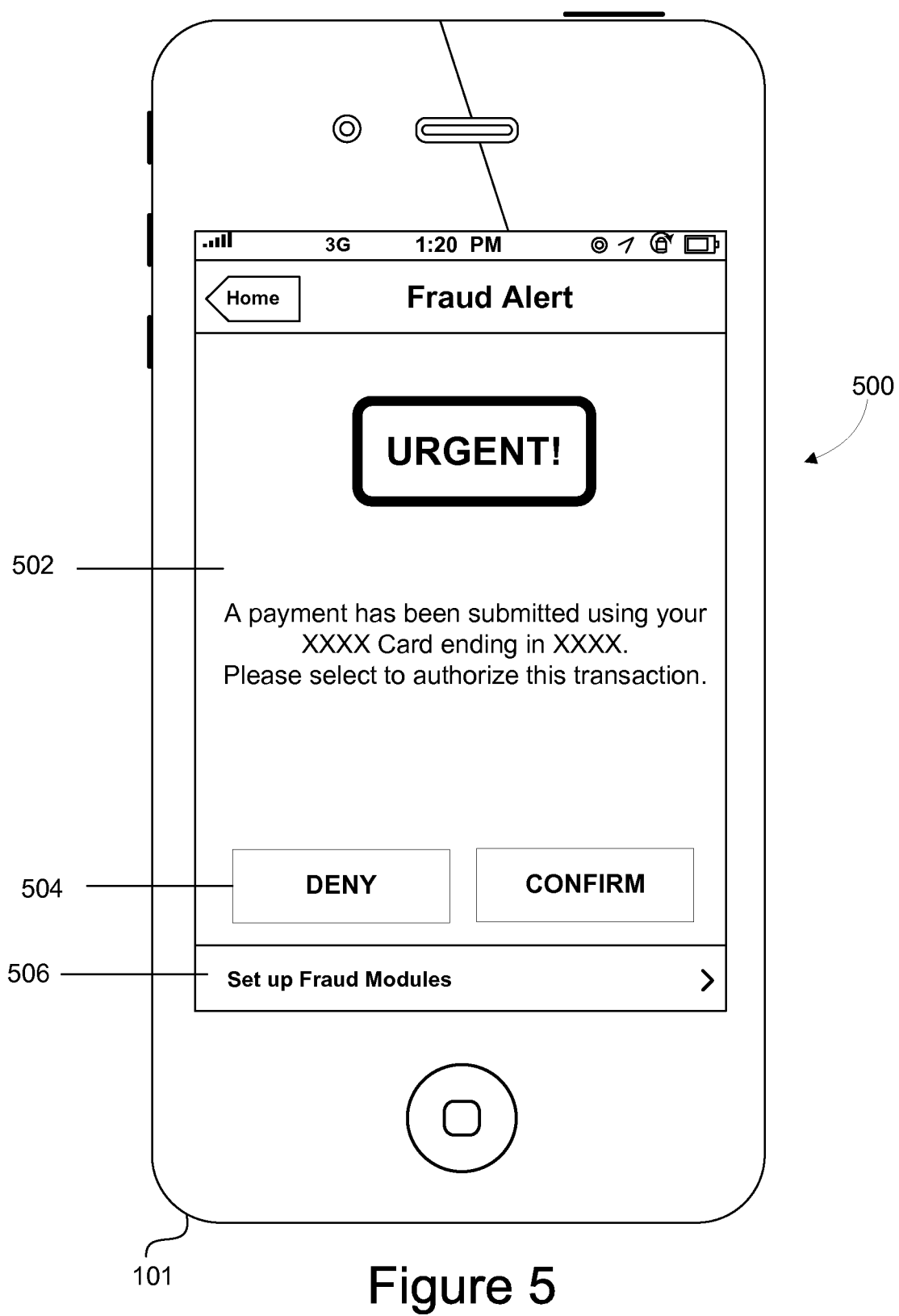
FIG. 5 depicts a screen shot of a mobile device associated with a fraud control system according to an exemplary embodiment.

For example, FIGS. 4 and 5 illustrate screen shots of a user communication device 101 receiving a fraud module response. FIG. 4 illustrates an example of a pre-authentication module 210 sending a fraud module response. In this example, a particular account is being used to make a transaction using a mobile wallet 400. In this example, the user must confirm 404 in order to proceed with the transaction 402.

FIG. 5 illustrates an example of a fraud module response 500 sent to a mobile device 101 when a fraud system 200 determines that account holder authorization is needed in order to proceed with the transaction 502. While authentication of a transaction is illustrated as being a prompt 504 that may be tapped or clicked in order to respond, a fraud module response may include other forms of authentication. Authentication of a transaction may occur using multi-factor authentication, login/password use, PIN, gesture-based PIN, facial/hand/voice recognition, fingerprint authentication, other biometric authentication, or any other form of authentication available on a communications device 101. As illustrated in FIG. 5, a user may also set up fraud modules 506 on the communications device 101 to alter fraud modules after each transaction, or at any desired time.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense

We claim:

1. An account-holder-configurable fraudulent transaction prevention system comprising:
   one or more processors; and
   at least one memory in communication with the one or more processors and storing computer program code that, when executed by the one or more processors, is configured to cause the one or more processors to:
      receive one or more parameters from a fraud module to be applied to an account, wherein a first parameter comprises a location-based transaction restriction including a first predetermined distance;
      receive transaction data from a point-of-sale (POS) terminal for a transaction, the transaction data comprising location data for the POS terminal and account-specific data;
      cause a mobile device to display the transaction data via a graphical user interface (GUI);
      receive GPS data and account holder data from the mobile device of an account holder, the GPS data indicative of a current location of the mobile device at a time the transaction is initiated and the account holder data associated with an account;
      determine that the GPS data is outside the first predetermined distance from the location data for the POS terminal;
      responsive to determining that the GPS data is outside the first predetermined distance, automatically send a request to the mobile device to cause the mobile device to modify the GUI to include a first selectable graphical input to enable the account holder to complete the transaction and a second selectable graphical input to enable the account holder to deny the transaction;
      receive a response from the mobile device to the request;
      complete the transaction if the account holder selects the first selectable graphical input; and
      deny the transaction if the account holder selects the second selectable graphical input.

2. The system of claim 1, further comprising: a pre-authentication module, an amount control module, and an account control module.

3. The system of claim 2, wherein the account control module determines whether the account is active and transmits an authentication alert to the mobile device when the transaction is attempted using an inactive account.

4. The system of claim 3, wherein the account control module determines whether the account is active based on one or more user-defined rules, the one or more user-defined rules specifying one or more days and one or more pre-defined time periods in which the account is active.

5. The system of claim 2, wherein at least one of the fraud module, the pre-authentication module, the amount control module, or the account control module:
   transmits a request to the mobile device for user identification information associated with the account,
   receives, from the account holder, the user identification information, via the mobile device, the user identification information comprising at least one of a login and password combination, a gesture, and biometric identification information,
   compares, for a match, stored user identification information and the user identification information, and
   denies the transaction when no match is found.

6. The system of claim 2, wherein the pre-authentication module
   transmits a request to the mobile device for a personal identification number associated with the account,
   receives the personal identification number associated with the account from the mobile device,
   compares, for a match, a stored personal identification number and the personal identification number, and
   denies the transaction when no match is found.

7. The system of claim 1, wherein a pre-defined transaction amount limit is configurable by the account holder using the fraud module.

8. The system of claim 1, wherein a financial institution defines a pre-defined transaction amount limit.

9. The system of claim 1, further comprising:
   applying one or more authorized geographic regions upon selection of the fraud module by the account holder.

10. The system of claim 1, wherein the first selectable graphical input and the second selectable graphical input are graphical buttons or icons capable of being pressed, tapped, or clicked.

11. The system of claim 1, wherein the account holder or a financial institution defines the first predetermined distance.

12. The system of claim 1, wherein the GPS data indicative of the current location of the mobile device at the time the transaction is initiated is a single data point.

13. A method comprising:
   receiving, at one or more processors, one or more parameters from a fraud module to be applied to an account, wherein a first parameter comprises a location-based transaction restriction including a first predetermined distance;
   receiving, at the one or more processors, transaction data for a transaction from a point-of-sale (POS) terminal, the transaction data comprising location data for the POS terminal and account-specific data;
   causing a mobile device to display the transaction data via a graphical user interface (GUI);
   receiving, at the one or more processors, GPS data and account holder data from the mobile device of an account holder, the GPS data indicative of a current location of the mobile device at a time the transaction is initiated and account holder data associated with an account;
   determining that the GPS data is outside the first predetermined distance from the location data for the POS terminal;
   responsive to determining that the GPS data is outside the first predetermined distance, automatically sending, to the mobile device, a request causing the mobile device to modify the GUI to include (i) a first selectable graphical input to enable the account holder to complete the transaction, (ii) a second selectable graphical input to enable the account holder to deny the transaction, and (iii) a warning notification indicating to the account holder the transaction is indicative of a fraudulent transaction and the account holder is required to select either the first selectable graphical input or the second selectable graphical input;
   receiving, from the mobile device, a response to the request; and
   completing, by the one or more processors, the transaction if the account holder selects the first selectable graphical input; and denying, by the one or more processors, the transaction if the account holder selects the second selectable graphical input.

14. The method of claim 13, further comprising: determining whether the account is active.

15. The method of claim 14, further comprising:
transmitting an authentication alert to the mobile device when the transaction is attempted while the account is inactive.

16. The method of claim 14, further comprising:
transmitting a request to the mobile device for user identification information associated with the account,
receiving the user identification information from the mobile device, the user identification information comprising at least one of a login and password combination, a gesture, and biometric identification information,
comparing, for a match, stored user identification information and the user identification information, and
denying the transaction when no match is found.

17. The method of claim 14, further comprising:
transmitting a request to the mobile device for a personal identification number associated with the account,
receiving the personal identification number associated with the account from the mobile device,
comparing, for a match, a stored personal identification number and the personal identification number, and
denying the transaction when no match is found.

18. The method of claim 13, further comprising:
applying a pre-defined transaction amount limit upon selection of the fraud module by the account holder.

19. The method of claim 18, wherein a financial institution defines the pre-defined transaction amount limit.

20. The method of claim 13, further comprising:
applying one or more authorized geographic regions upon selection of the fraud module by the account holder.

* * * * *